US011885435B2

(12) United States Patent
Kuhn et al.

(10) Patent No.: US 11,885,435 B2
(45) Date of Patent: Jan. 30, 2024

(54) PRESSURE RELIEF VALVE AND METHOD OF RELIEF VALVE OPENING DETECTION

(71) Applicant: Hansen Technologies Corporation, Burr Ridge, IL (US)

(72) Inventors: Orval Kuhn, Downers Grove, IL (US); Michael Fischer, Lewis Center, OH (US); Santhosh Kumar, Naperville, IL (US); Bryant Crane, Western Springs, IL (US)

(73) Assignee: HANSEN TECHNOLOGIES LLC, Burr Ridge, IL (US)

( * ) Notice: Subject to any disclaimer, the term of this patent is extended or adjusted under 35 U.S.C. 154(b) by 0 days.

(21) Appl. No.: 17/931,252

(22) Filed: Sep. 12, 2022

(65) Prior Publication Data

US 2023/0003315 A1   Jan. 5, 2023

Related U.S. Application Data

(62) Division of application No. 16/801,504, filed on Feb. 26, 2020, now Pat. No. 11,480,265.

(60) Provisional application No. 62/828,008, filed on Apr. 2, 2019, provisional application No. 62/810,682, filed on Feb. 26, 2019, provisional application No. 62/810,667, filed on Feb. 26, 2019.

(51) Int. Cl.
*F16K 37/00* (2006.01)
*F16K 17/04* (2006.01)
*F16K 17/14* (2006.01)
*F16K 17/06* (2006.01)
*F16K 17/16* (2006.01)

(52) U.S. Cl.
CPC .......... *F16K 37/0041* (2013.01); *F16K 17/04* (2013.01); *F16K 17/06* (2013.01); *F16K 17/14* (2013.01); *F16K 17/16* (2013.01); *F16K 37/0008* (2013.01); *F16K 37/0025* (2013.01); *F16K 37/0058* (2013.01)

(58) Field of Classification Search
CPC ............ F16K 37/0041; F16K 37/0008; F16K 37/0025; F16K 37/0058; F16K 17/04; F16K 17/06; F16K 17/14; F16K 17/16
See application file for complete search history.

(56) References Cited

U.S. PATENT DOCUMENTS 6,283,138 B1 * 9/2001 Friend .................... F16K 17/06
                                                               137/554
2017/0292629 A1 * 10/2017 Dolenti .................. G01D 5/202

* cited by examiner

*Primary Examiner* — Patrick C Williams
(74) *Attorney, Agent, or Firm* — Snyder, Clark, Lesch & Chung, LLP

(57) ABSTRACT

Systems and methods described herein provide for pressure relief valve detection and monitoring. A valve assembly includes a striker and an indicator assembly separated by a diaphragm. The diaphragm may be elastically or permanently deformable. The striker may be connected to a relieve valve disk that releases in response to high fluid pressure at the valve. Movement of the striker may be detected by contact with the diaphragm or by sensors near the diaphragm, which may trigger the indicator assembly to provide an external indication of a valve opening.

17 Claims, 16 Drawing Sheets

US 11,885,435 B2

PRESSURE RELIEF VALVE AND METHOD OF RELIEF VALVE OPENING DETECTION

CROSS-REFERENCE TO RELATED APPLICATIONS

This application is a divisional of U.S. application Ser. No. 16/801,504, filed on Feb. 26, 2020, which claims priority under 35 U.S.C. § 119, based on U.S. Provisional Patent Application No. 62/810,667 filed Feb. 26, 2019, U.S. Provisional Patent Application No. 62/810,682 filed Feb. 26, 2019, and U.S. Provisional Patent Application No. 62/828,008 filed Apr. 2, 2019, each entitled "Pressure Relief Valve and Method of Relief Valve Opening Detection," the disclosures of which are hereby incorporated by reference.

FIELD OF THE INVENTION

The invention relates to pressure relief valves and methods of detecting a relief valve opening.

BACKGROUND OF THE INVENTION

Pressure relief valves may be included in various refrigeration systems to release an over-pressurized fluid to prevent rupture of pressure vessels or pipes of the refrigeration system. Once the relief valve discharges an over pressurized fluid, the relief valve will generally need to be replaced.

Refrigeration systems may utilize many relief valves such that it may be difficult to determine which of the many valves has discharged in an over-pressure condition so that the valve may be replaced if necessary. A labor-intensive investigation may often be required for determining which valve has discharged.

Various systems and methods are known in the art including monitoring of flow, pressure, acoustics and vibration to detect a discharge. However such systems may provide false signals from valves that are in proximity to each other. Additional systems may include complex valve position sensors that significantly increase the cost and complexity of a refrigeration system and are, therefore, not desirable.

DETAILED DESCRIPTION OF THE PREFERRED EMBODIMENTS

Figure 1A:
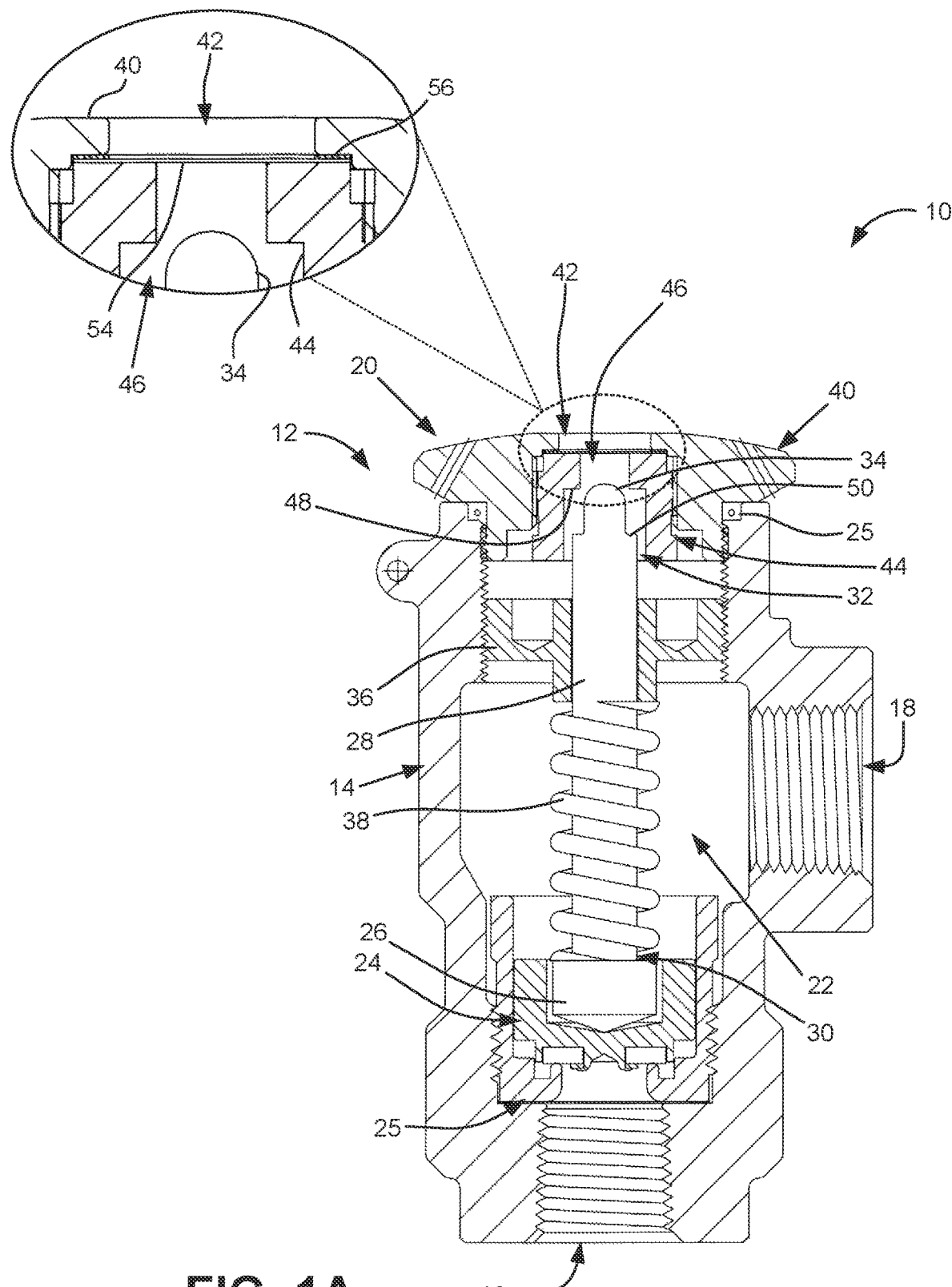
FIG. 1A is a sectional view of a pressure relief valve and indicator assembly, according to an implementation.

The following detailed description refers to the accompanying drawings. The same reference numbers in different drawings identify the same or similar elements.

There is a need for pressure relief valve detection and monitoring device, which will identify the specific relief valve, or valves, which have discharged when an over-pressure event occurs within the refrigeration system and is easily identified. There is a further need for a pressure relief valve detection and monitoring device that is not wired and provides a non-intrusive attachment to a refrigeration system.

Systems described herein provide for pressure relief valve detection and monitoring. A valve assembly includes a striker and an indicator assembly separated by a diaphragm. The diaphragm may be elastically or permanently deformable. The striker may be connected to a relieve valve disk that releases in response to high fluid pressure at the valve. Movement of the striker may be detected by contact with the diaphragm or by sensors near the diaphragm, which may trigger the indicator assembly to provide an external indication of a valve opening.

Referring to FIGS. 1A-6, a pressure relief valve monitoring device 10 is disclosed. The device includes a pressure relief valve 12 having a valve body 14, with an inlet port 16 and separated outlet port 18. A cap assembly 20 is attached at one end of the valve body 14.

A valve assembly 22 is disposed within the valve body 14. The valve assembly 22 includes a valve seat insert 24 attached to the valve body 14. The valve seat insert 24 may include gaskets 25. A disk 26 (e.g., a piston) is disposed within the valve body 14 and is shaped to fit within the valve seat insert 24. The disk 26 includes stem 28 with the disk 26 attached to a proximal end 30 of the stem 28 and extending to a longitudinally spaced distal end 32 that defines a striker 34. The distal end 32 of the stem 28 passes through an adjustment gland 36 that is threaded with the valve body 14. A compression spring 38 is positioned about the stem 28 and bears against the adjustment gland 36 and the disk 26 biasing the disk 26 into the valve seat insert 24 to maintain the valve assembly 22 in a normally closed position.

Referring to FIGS. 1A through 2B, the cap assembly 20 includes a cap body 40 having a bore 42 formed there-through. The bore 42 receives an inner nut 44 attached thereon. The inner nut 44 includes a through bore 46 having a ledge 48 formed thereon. The ledge 48 interacts with a corresponding shoulder 50 formed on the distal end 32 of the stem 28 to define a stop for limiting movement of the stem 28.

Referring to FIGS. 1A, in one aspect, a diaphragm 54 and diaphragm gasket 56 are positioned in the bore 42 above the inner nut 44. The diaphragm 54 may be formed of various materials such metal, plastic or rubber such that it deforms when the diaphragm 54 is contacted by the striker 34, as will be discussed in more detail below. The deformation may be permanent such that it is observable to communicate that a valve opening has occurred. The diaphragm 54 may also serve as a barrier sealing an inner volume of the valve body 14 from an outside environment.

Figure 1B:
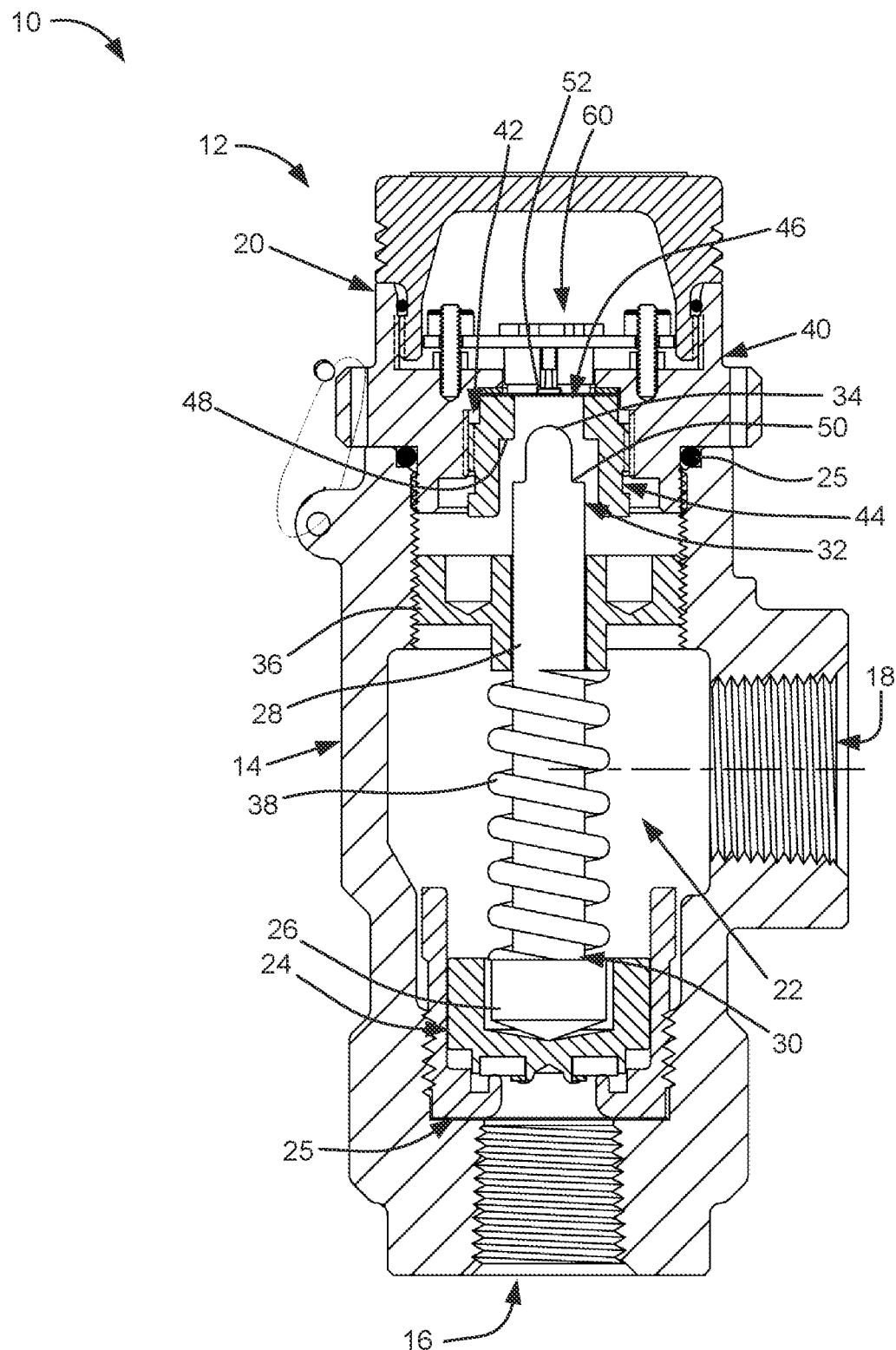
FIG. 1B is a sectional view of an exemplary pressure relief valve and indicator assembly, according to another implementation.

In the example of FIG. 1B, in another aspect, switch or sensor 52 may be positioned in the bore 42 above the inner nut 44. The switch or sensor 52 may be contacted by the striker 34, to communicate that a valve opening has occurred, as will be discussed in more detail below. The switch or sensor 52 may be one of various types, such as an electrical switch or a strain gauge having a first and a second signal position correlating to the position of stem 28.

Figure 2A:
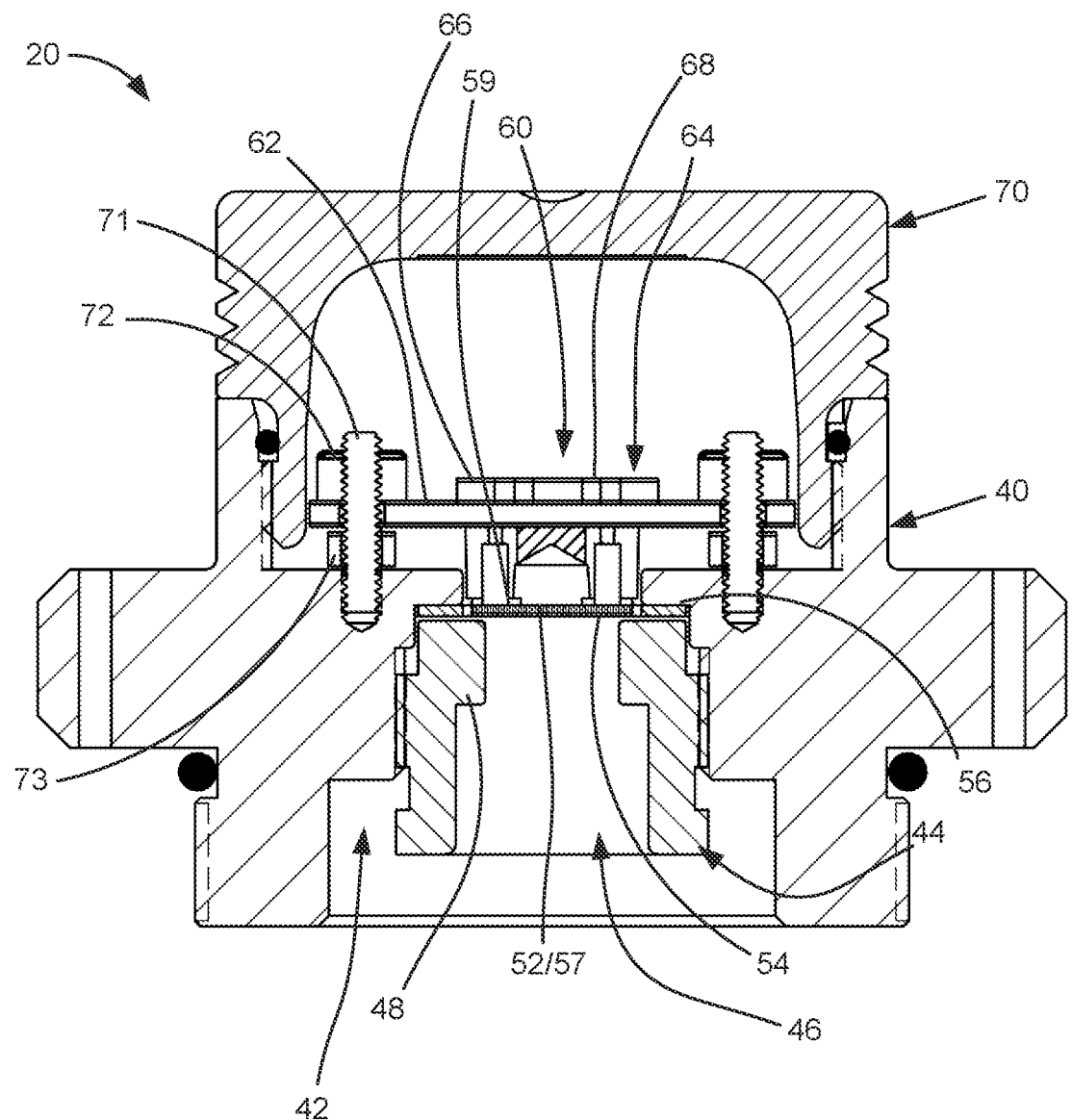
FIGS. 2A and 2B are enlarged sectional views of the cap assembly of the pressure relief valve and indicator assembly of FIG. 1B, according to different implementations.

In another aspect, shown in FIG. 2A, a switch or sensor 52 may include a strain gauge or strain sensor 57 mounted to the diaphragm 54. Upon valve opening, the striker 34 makes contact and strains the diaphragm 54. The strain sensor 57 may send a signal that changes from an initial signal state to final signal state. Auxiliary electronics or sensing circuitry 59 may measure changes in the strain sensor 57 signal state, and may indicate and communicate that a valve opening event has occurred.

Referring to FIGS. 1B and 2A, in another aspect, a diaphragm 54 and diaphragm gasket 56 are positioned in the bore 42 above the inner nut 44. The diaphragm 54 may be formed of various materials such metal, plastic or rubber such that it deforms when the diaphragm 54 is contacted by the striker 34, as will be discussed in more detail below. The deformation may be permanent such that it is observable or it may be elastic and is not permanent. In one aspect, an elastic diaphragm 54 may include switch or sensor 52 positioned in the bore 42 above the diaphragm 54. The switch or sensor 52 may be contacted by the diaphragm 54, to communicate that a valve opening has occurred, as will be discussed in more detail below. The diaphragm 54 may serve as a barrier sealing the inner volume of the valve body 14 from an outside environment.

Figure 2B:
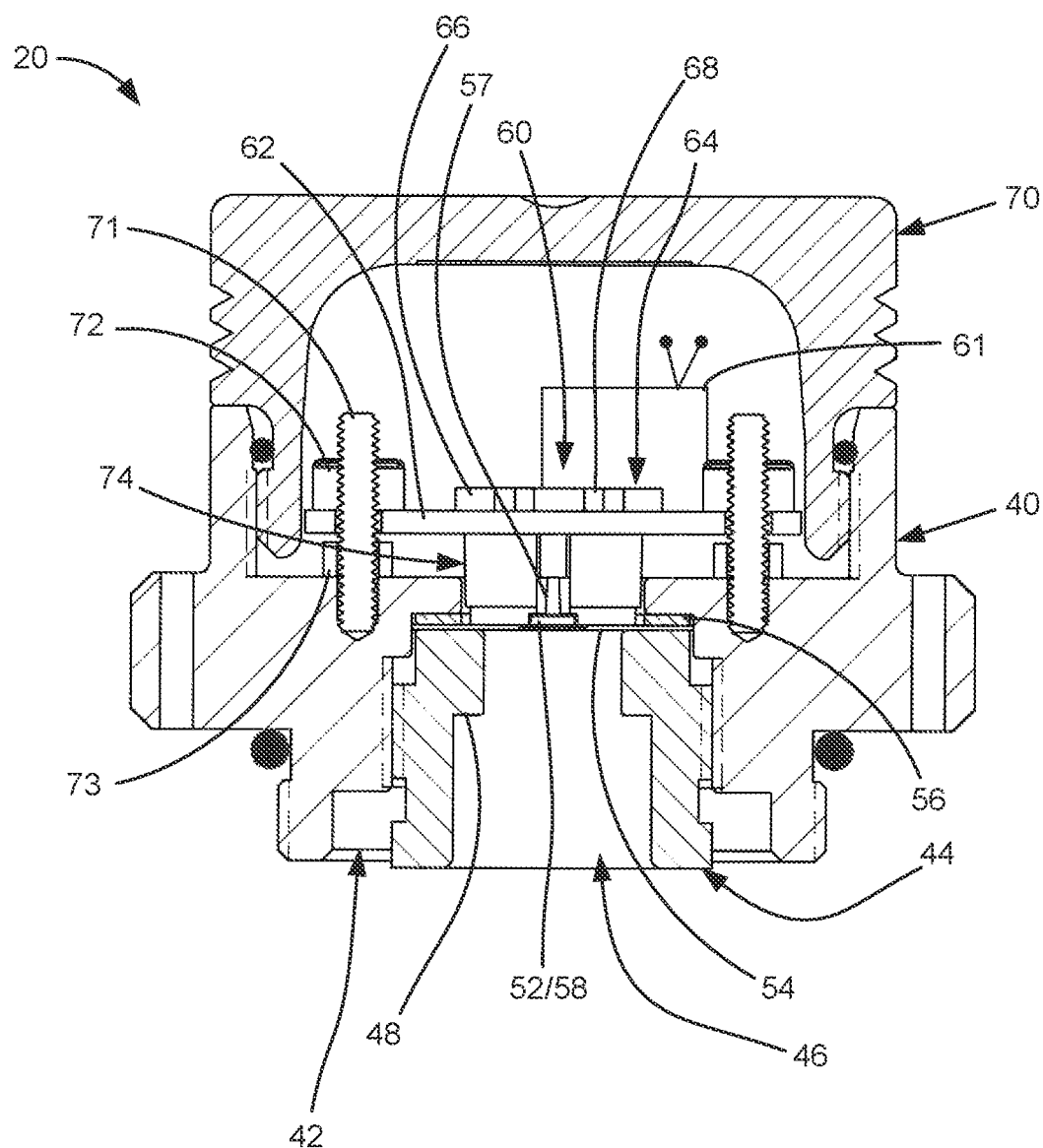
Figure 3:
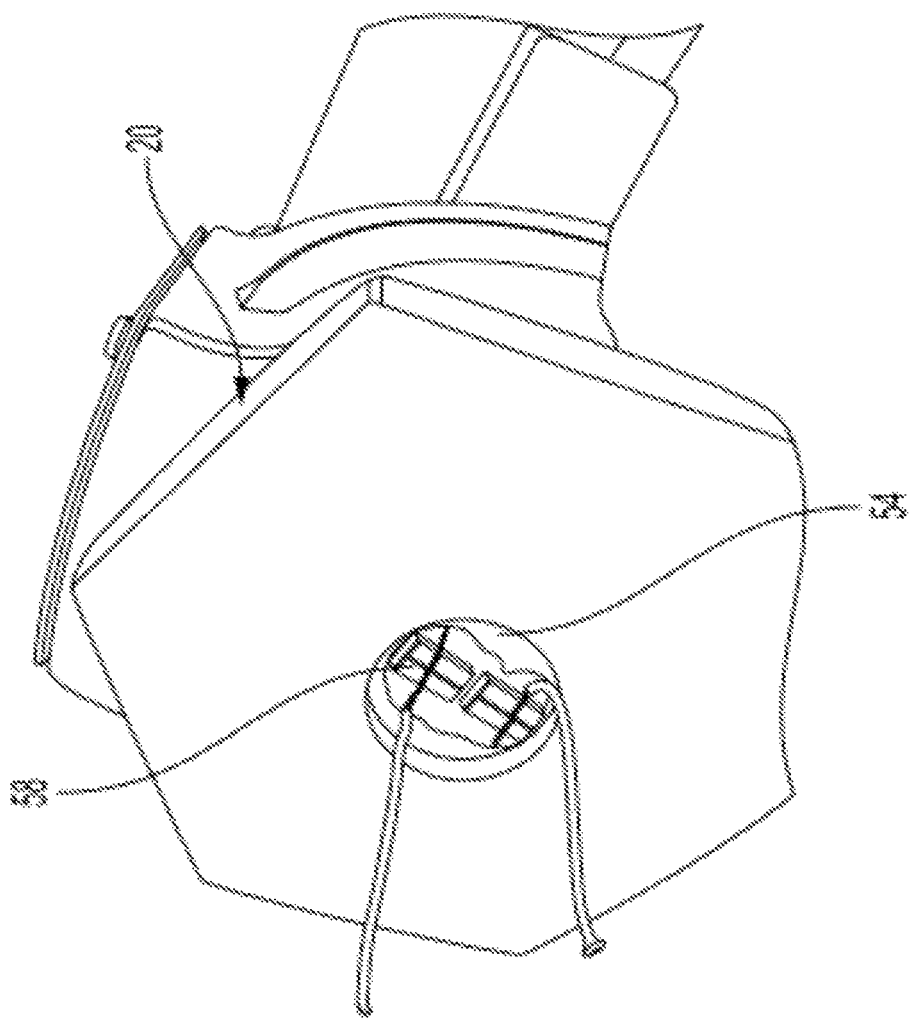
FIG. 3 is a perspective view of a top of a cap body, according to an implementation.
Figure 4:
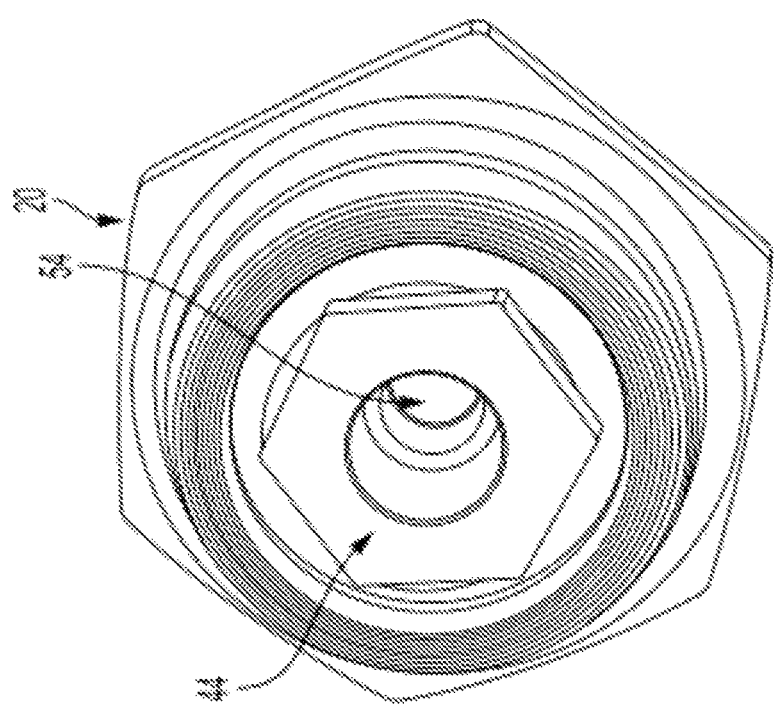
FIG. 4 is a plan view of a bottom of the cap assembly of the pressure relief valve and indicator assembly of FIG. 1A.
Figure 5:
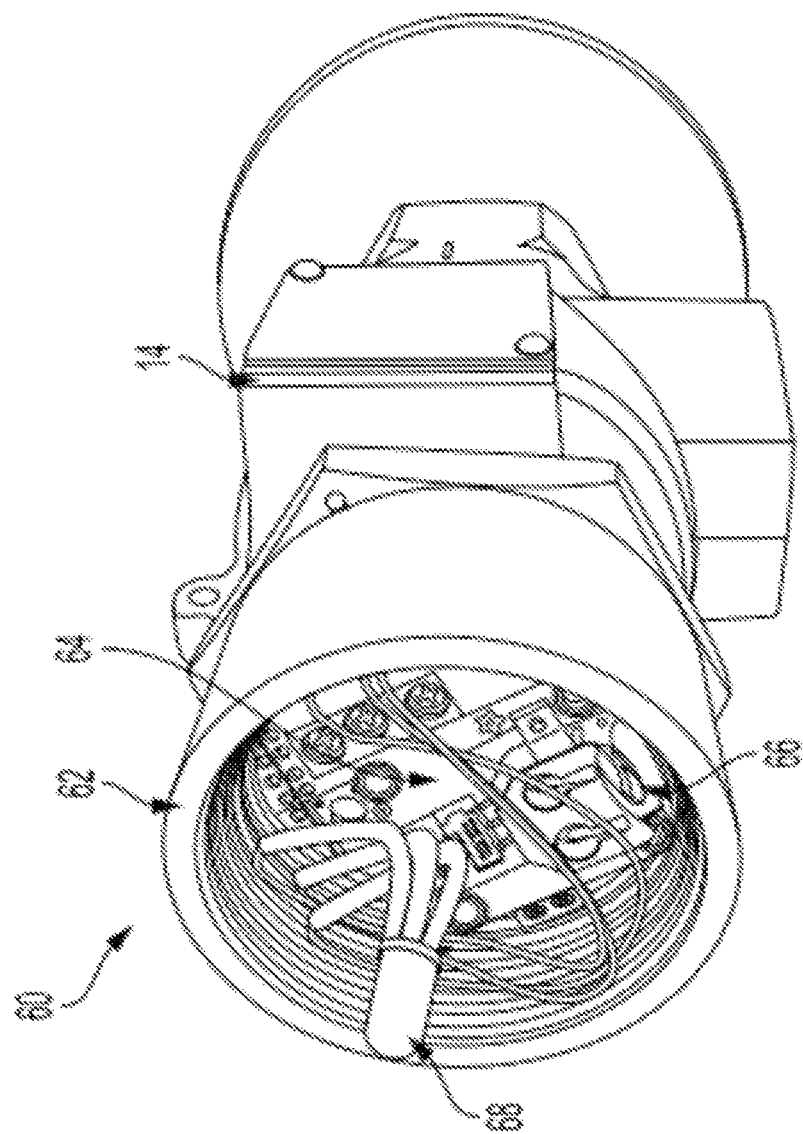
FIG. 5 is a perspective view of an indicator assembly, according to an implementation.
Figure 6:
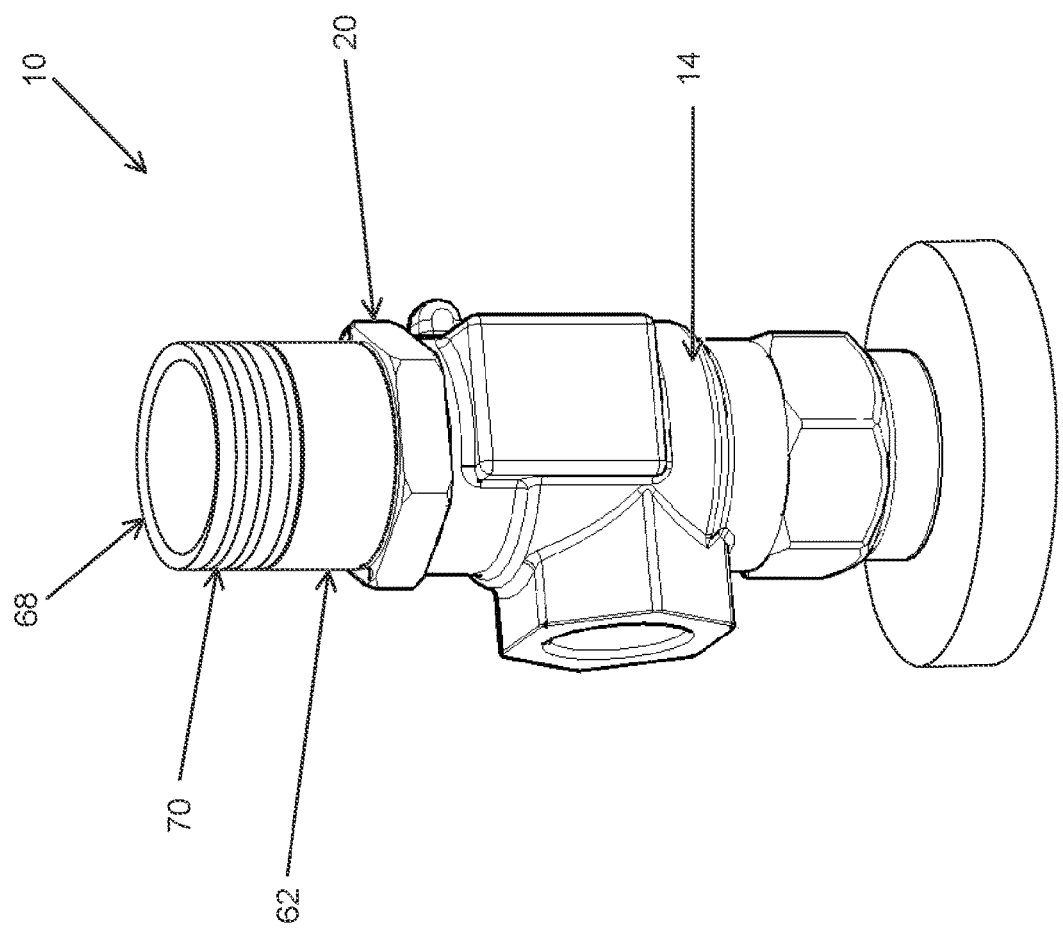
FIG. 6 is a perspective view of a pressure relief valve and indicator assembly, according to an implementation.

In another aspect, shown in FIGS. 2B and 3, switch or sensor 52 may include a frangible fuse 58 mounted above or on the diaphragm 54. Frangible fuse 58 may break upon deformation of the diaphragm 54 to communicate that a valve opening has occurred. The frangible fuse 58 may include a glass-like substrate formed of alumina ceramics or other suitable materials and include an electrical trace formed thereon.

Referring to FIGS. 1B, 2A, 2B, 5, and 6, according to an implementation, the pressure relief valve monitoring device 10 may include an indicator assembly 60 mounted in the cap assembly 20. The indicator assembly 60 includes an indicator body 62 that receives a circuit board 64, a power source 66 (also referred to herein as battery 66), and a light source 68 (also referred to herein as light emitting diode (LED) 68). In another implementation, indicator assembly 60 may include switch 52, strain sensor 57, or frangible fuse 58 and associated auxiliary electronics or sensing circuitry 59. A translucent or transparent housing 70 may be mounted on the indicator body 62 for viewing of the LED 68. According to an implementation, LED 68 may be configured to be seen through housing 70 from a relatively long distance, such as 3 meters or more, to enable an operator to easily determine that a valve has discharged. In some embodiments, LED 68 may provide white or colored (e.g., red) light and/or be configured to flash when activated.

According to an implementation, indicator body 62 may be adjustable to position circuit board 64 in relation to diaphragm 54 and/or switch 52. One or more set screws 71, lock nuts 72, and spacers 73 may be used to set vertical spacing of indicator body 62. Additionally, or alternatively, a fuse holder 74 (FIG. 2B) may be attached to an underside of indicator body 62 to secure and properly orient, for example, frangible fuse 58.

In operation, the valve assembly 22 is formed to move into at least one open position in response to the release of fluid pressure through the valve, which occurs when the fluid pressure has enough force to unseat the disk 26 from the valve seat inset 24 against the biasing force of the spring 38. When the valve is actuated, the stem 28 travels upward and the striker 34 contacts either a switch 52 or the diaphragm 54.

In the case of switch 52 or strain sensor 57 (e.g., FIG. 2A), the switch/sensor may send a signal to the indicator assembly 60 such that the LED 68 is illuminated to visually indicate that the valve has been actuated. Battery 66 may be sized/configured to maintain illumination of the LED 68 for a desired time period, such as for at least 24 hours.

Alternatively, when the valve is actuated, the stem 28 travels upward and the striker 34 contacts the diaphragm 54 deforming the diaphragm 54. In place of switch 52, a frangible fuse 58 (e.g., FIG. 2B) is mounted above the diaphragm 54. Fuse 58 breaks when diaphragm 54 is deformed by striker 34 and sends a signal to the indicator assembly 60 such that the LED 68 is illuminated to visually indicate that the valve has been actuated. Alternatively, the striker 34 may contact the frangible fuse 58 directly to break the fuse 58. Fuse 58 may be mounted on diaphragm 54 that is contacted by the striker, and diaphragm 54 serves as a barrier sealing the inner volume of the valve body from indicator assembly 60 and/or an outside environment.

Figure 15:
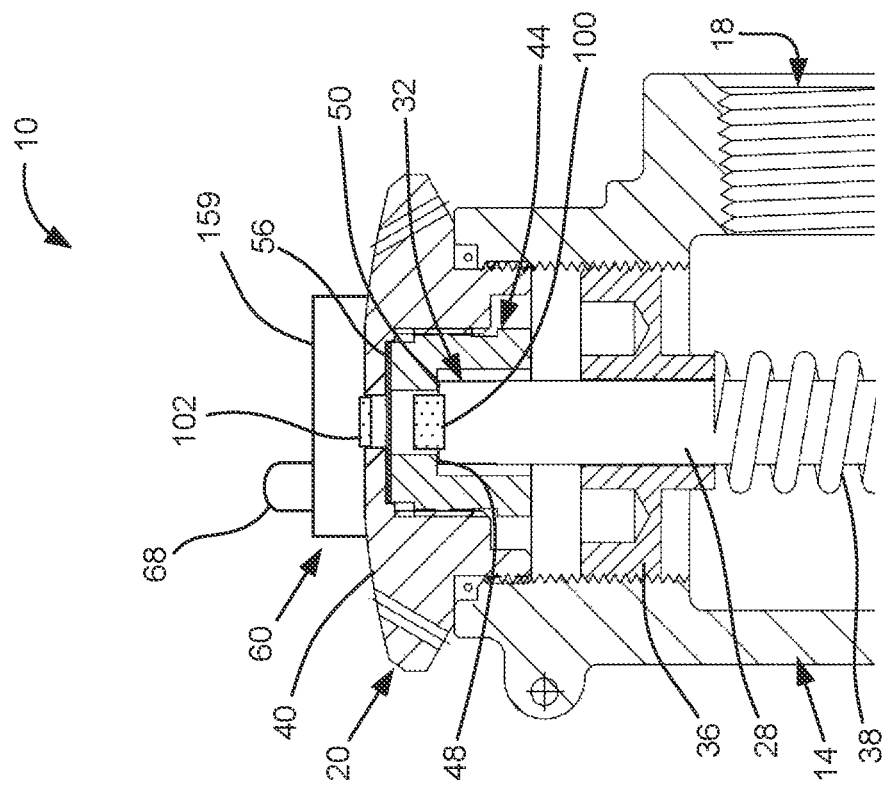
FIGS. 15 and 16 are partial sectional views of a pressure relief valve and indicator assembly including another magnetic sensor, according to another implementation.

According to an implementation, such as described further in connection with FIG. 15, the sensing circuitry 59 and/or indicator assembly 60 may also include a transceiver 61 (FIG. 2B) for wireless communications. Thus, in addition to illuminating LED 68, pressure relief valve monitoring device 10 may provide a wireless signal that communicates with a phone (e.g., a smart phone), computer, or other device to indicate the relief valve has opened.

In another aspect, when the valve is actuated, the stem 28 travels upward and the striker 34 contacts the diaphragm 54 deforming the diaphragm 54. The indicator assembly 60 may not include the electrical components such as the circuit board 64, battery 66 and LED 68. In such an embodiment, the indicator assembly 60 may include only a translucent or transparent housing 70 for viewing of the deformed diaphragm 54 to visually indicate that the valve has been actuated. In another embodiment, indicator assembly 60 may include a chemical vial or pressurized ink vial, such that deformation of diaphragm 54 may cause the chemical vial or ink vial to rupture and chemically illuminate, color, or otherwise splatter or release ink inside translucent housing 70, yielding a visible indication that the valve has been actuated.

Figure 7:
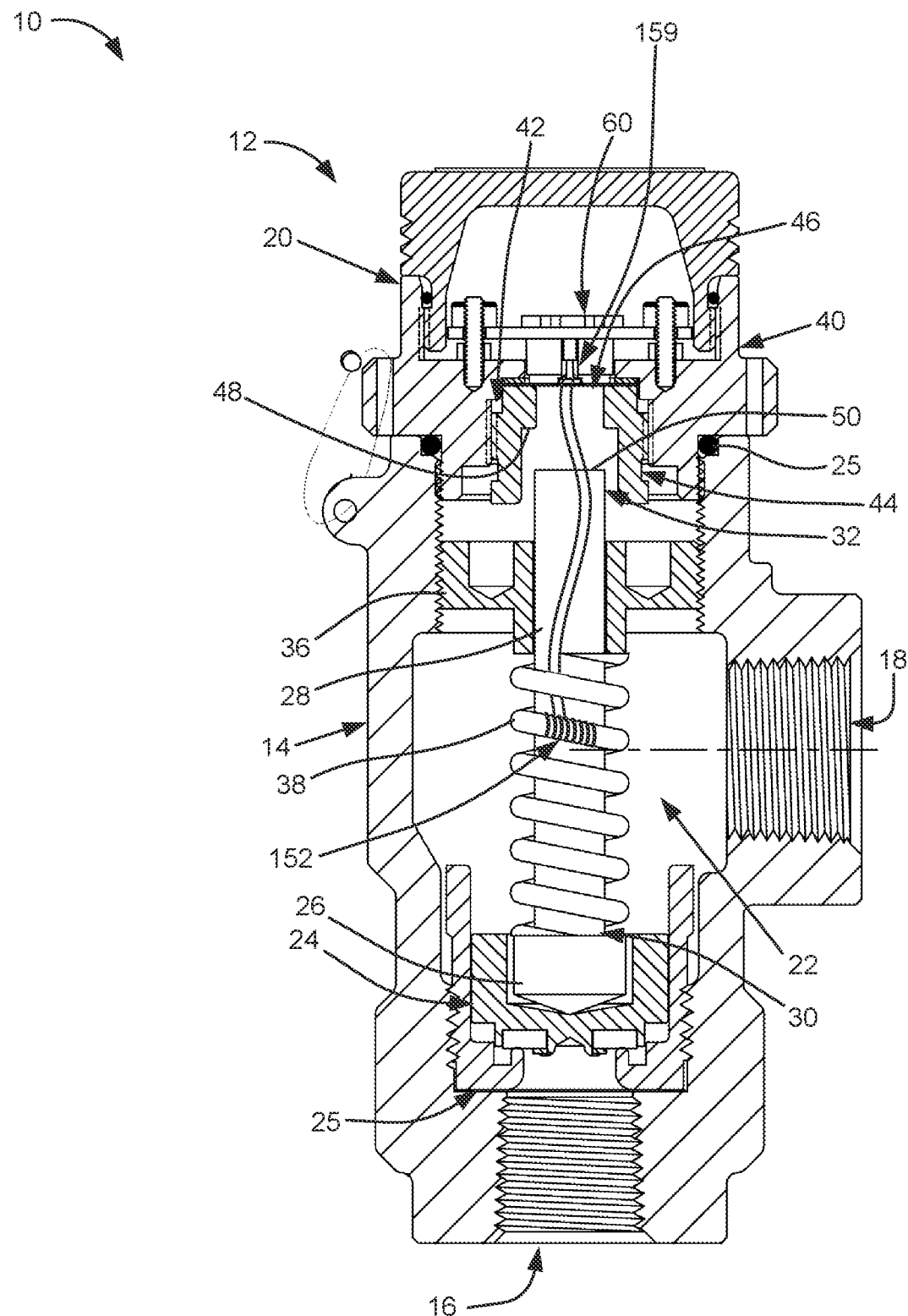
FIG. 7 is a sectional view of a pressure relief valve and indicator assembly including a strain sensor, according to another implementation.

FIG. 7 illustrates another exemplary embodiment of the pressure relief valve monitoring device 10 with the structure including a strain sensor 152. Pressure relief valve monitoring device 10 includes a pressure relief valve 12 having a valve body 14, with an inlet port 16 and separated outlet port 18, as described above with respect to FIG. 1. As shown in FIG. 7, the strain sensor 152 may connected with the compression spring 38.

When the pressure relief valve opens, the upward action of disk 26 and stem 28 of valve assembly 22 compresses the compression spring 38. Strain sensor 152 measures the increased strain on compression spring 38. Auxiliary sensing circuitry 159 measures the increased strain, and creates an electrical signal that indicates and communicates that a valve opening event has occurred.

Auxiliary electronics or sensing circuitry 159 may measure change in the strain sensor 152 signal state, and indicate/communicate that a valve opening event has occurred. According to an implementation, the sensing circuitry 159 may communicate with indicator assembly 60 and may send a signal to the indicator assembly 60 such that an LED 68 is illuminated to visually indicate that the valve has been actuated. According to another implementation, such as described further in connection with FIG. 15, the sensing circuitry 159 and/or indicator assembly 60 may provide a wireless signal that communicates with a phone, computer, or other device to indicate the relief valve has opened.

Figure 8:
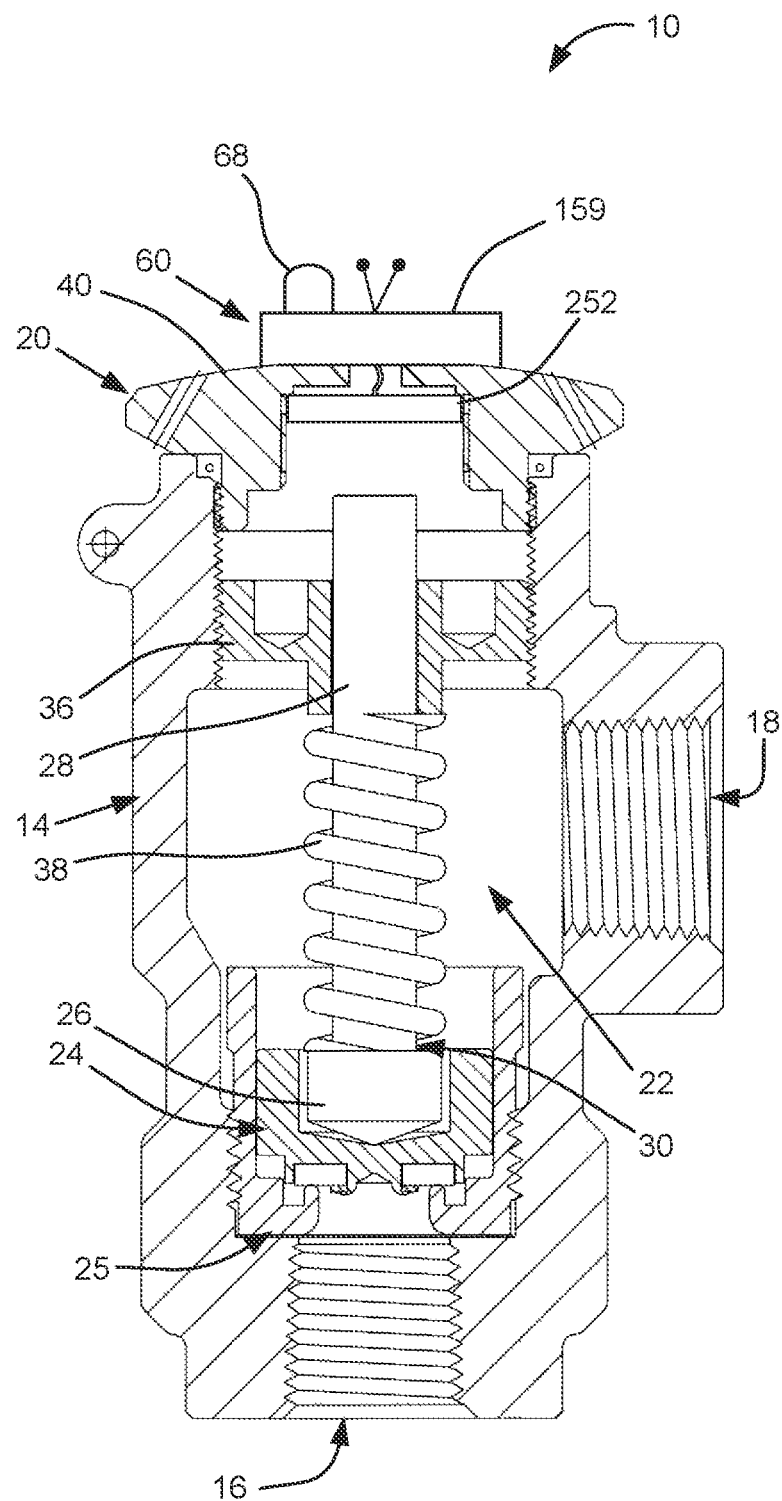
FIG. 8 is a sectional view of a pressure relief valve and indicator assembly including a pressure sensor, according to another implementation.

FIG. 8 illustrates another exemplary pressure relief valve monitoring device 10. The pressure relief valve monitoring device 10 includes a pressure relief valve 12 having a valve body 14, with an inlet port 16 and separated outlet port 18, as described above with respect to FIG. 1A.

In the depicted embodiment of FIG. 8, a pressure sensor 252 is mounted within pressure relief valve cap 20 and reacts with the pressure developed when the relief valve opens. In one aspect, the pressure sensor 252 may also be located at other positions within or on the pressure relief valve 12. The pressure developed within the pressure relief valve 12 is typically 5% to 15% of the valve set pressure (relative to atmospheric pressure). The pressure sensor 252 detects the pressure change and provides a signal. Auxiliary electronics or sensing circuitry 159 communicates with the pressure sensor 252 and indicates and communicates that a valve opening event has occurred. The sensing circuitry 159 may communicate with an indicator assembly 60 and may send a signal to the indicator assembly 60 such that an LED 68 is illuminated to visually indicate that the valve has been actuated. The sensing circuitry 159 and/or indicator assembly 60 may provide a wireless signal that communicates with a phone, computer or other device to indicate the relief valve has opened.

In the depicted embodiment of FIG. 8, acoustic or vibration sensor 252 is mounted within pressure relief valve cap 20 and reacts with the acoustic noise developed when the relief valve opens. In one aspect, the acoustic or vibration sensor 252 may also be located at other positions within or on the pressure relief valve 12, such as on top of valve cap 20. The acoustic or vibration sensor 252 detects the acoustic noise or vibration when the relief valve opens, and provides a signal. Auxiliary electronics or sensing circuitry 159 communicates with the acoustic or vibration sensor 252 and indicates and communicates that a valve opening event has occurred. The sensing circuitry 159 may communicate with an indicator assembly 60 and may send a signal to the indicator assembly 60 such that an LED 68 is illuminated to visually indicate that the valve has been actuated. The sensing circuitry 159 and/or indicator assembly 60 may provide a wireless signal that communicates with a phone, computer or other device to indicate the relief valve has opened.

Figure 10:
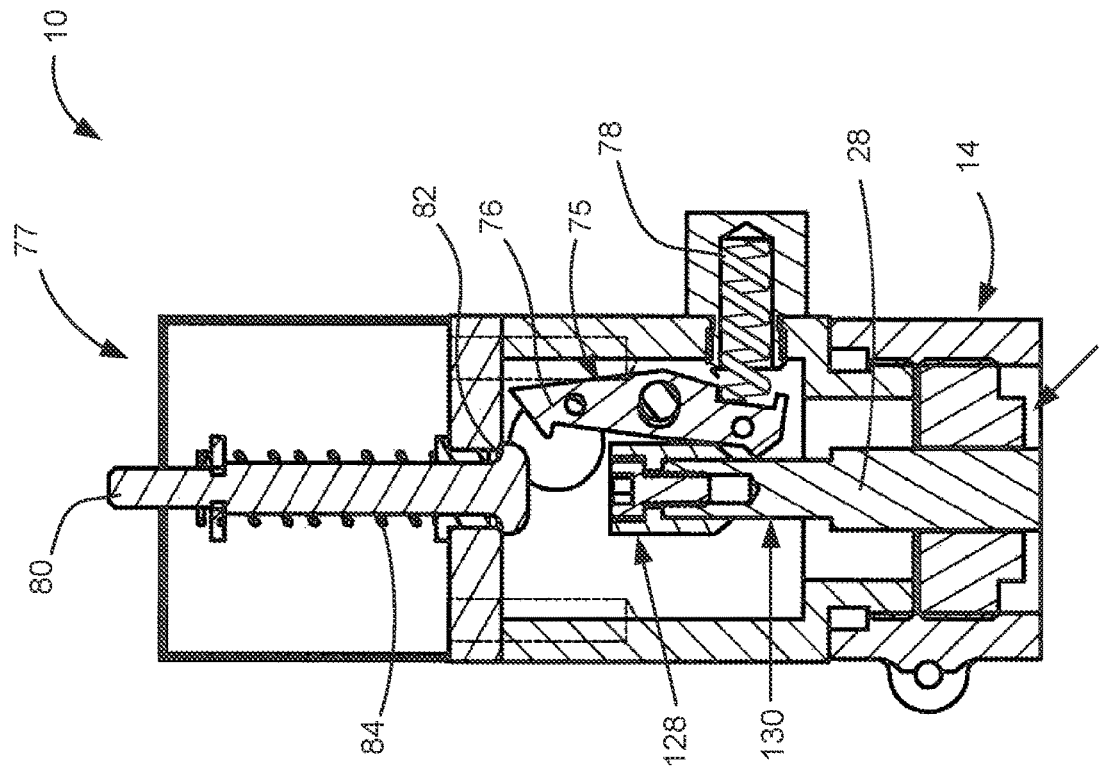
FIGS. 9 and 10 are partial sectional views of a pressure relief valve and indicator assembly including a stroke actuated trigger, according to another implementation.
Figure 9:
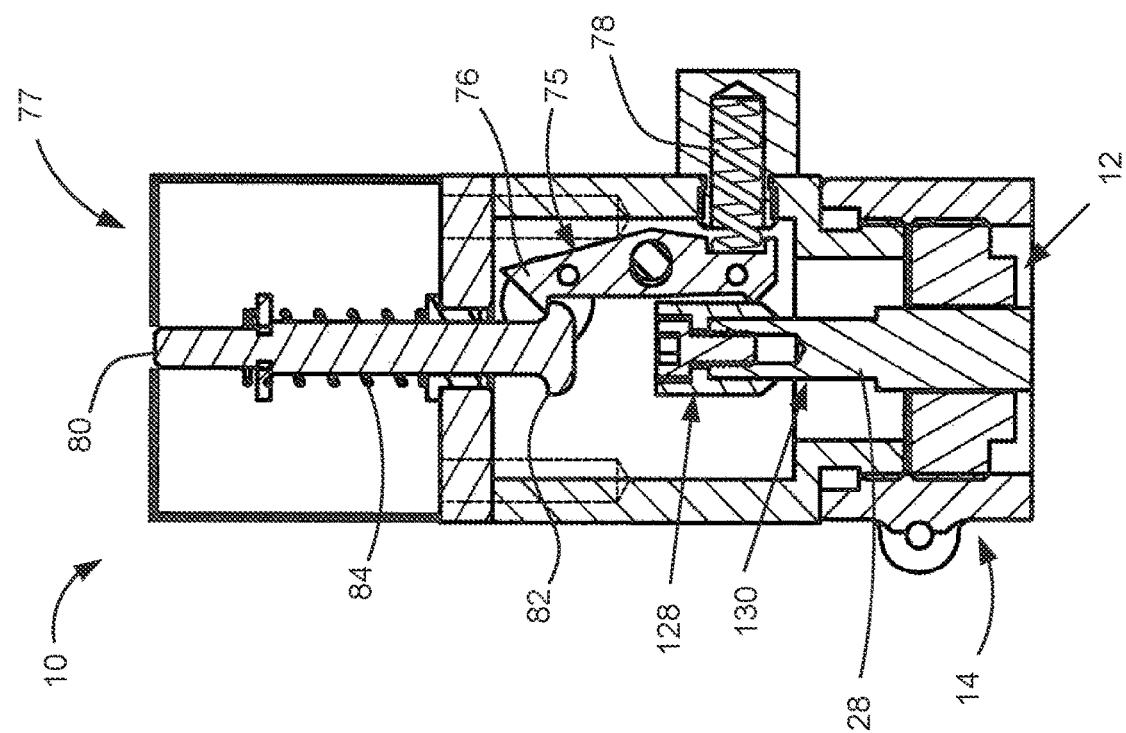

FIGS. 9 and 10 illustrate a portion of another pressure relief valve monitoring device 10. The pressure relief valve monitoring device 10 includes a pressure relief valve 12 having a valve body 14, with an inlet port 16 and separated outlet port 18, as described above with respect to FIG. 1B.

As shown in FIGS. 9 and 10, a pressure relief valve opening event causes the valve stem 28 to move up in a longitudinal direction with respect to bore 42. Stem 28 may include a larger diameter portion 128 at distal end 32 and a smaller diameter portion 130 below the larger diameter portion 128. A trigger 75 is disposed within a top cap assembly 77. The trigger 75 includes a pivotally mounted latch 76 that is biased by a biasing spring 78 to a latched position against the larger diameter portion 128 of stem 28, as shown in FIG. 9. A spring-loaded indicator 80 is releasably coupled with the latch 76 at a seat 82. Upward translation of the valve stem 28 exposes smaller diameter portion 130 of stem 28 to latch 76 and allows latch 76 to tip away from spring-loaded indicator 80, releasing the seat 82. An auxiliary spring 84 provides the motive force to lift and hold the indicator 80 in the position indicating that the valve has opened, as shown in FIG. 10. Proper mounting of the trigger 75, utilizing a slotted pivot, allows manual reset of the indicator 80 without binding by simply manually pressing the indicator back down to the ready position (shown in FIG. 9). In one aspect, a minimal force and minimal friction are imparted upon the valve stem 28, improving valve accuracy.

According to an implementation, the configuration of pressure relief valve monitoring device 10 in FIGS. 9 and 10 may be combined with features described above in connection with FIGS. 1-7. For example, trigger 75 may engage stem 28 at larger diameter portion 128 when disk 26 is in valve seat 24 and may engage stem 28 at smaller diameter portion 130 when disk 26 is released from valve seat 24. Indicator assembly 60 may be configured to form an active (e.g., closed) circuit between the battery 66 and LED 68 when trigger 75 is biased against smaller diameter portion 130.

Figure 12:
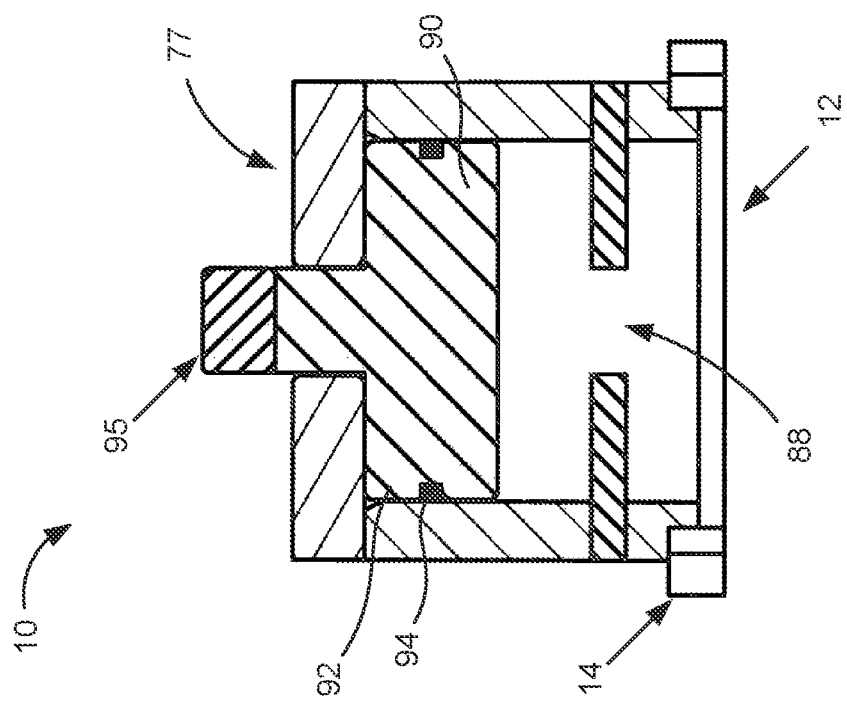
FIGS. 11 and 12 are partial sectional views of a pressure relief valve and indicator assembly including a pressure-actuated pop mechanism, according to another implementation.
Figure 11:
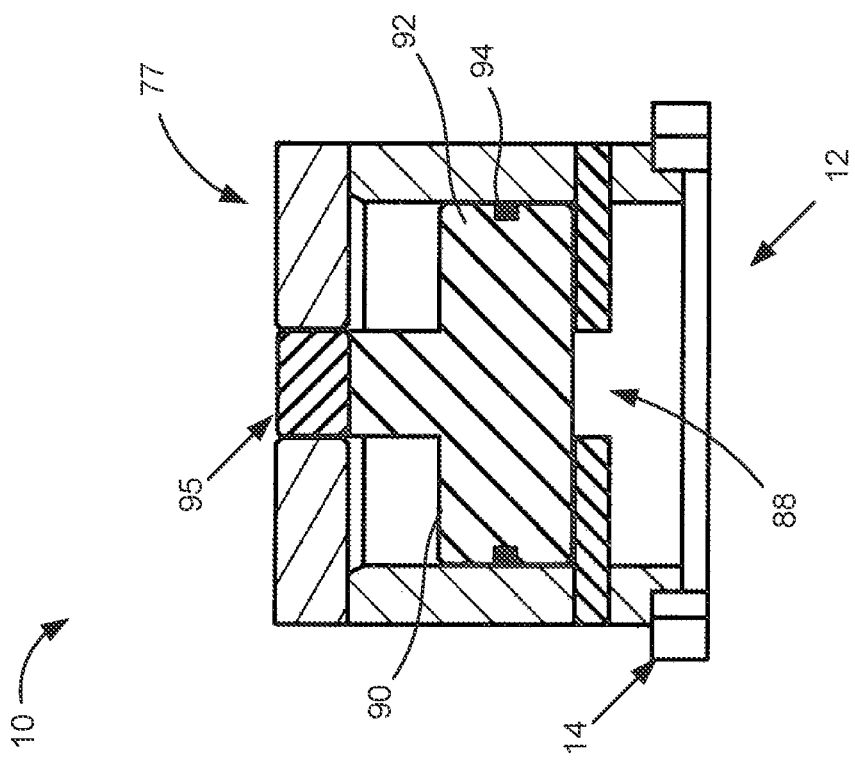

FIGS. 11 and 12 illustrate a portion of another pressure relief valve monitoring device 10. The pressure relief valve monitoring device 10 includes a pressure relief valve 12 having a valve body 14, with an inlet port 16 and separated outlet port 18, as described above with respect to FIG. 1B.

As shown in FIGS. 11 and 12, the pressure relief valve includes a top cap assembly 77. The top cap assembly 77 includes a vent passage 88 formed therein. Pressure relief valve opening results in a valve-cavity pressure typically from 5% to 15% of the valve activation set pressure (that is, relative to ambient pressure). The valve cavity pressure that results from an opening event is communicated through vent passage 88 and acts upon a popper indicator 90 having a piston area 92. The valve cavity pressure is sufficient to overcome sealing ring 94 friction, causing translation upward of popper indicator 90 from the initial position shown in FIG. 11 to the position illustrated in FIG. 12. Sealing ring 94 prevents escape of valve fluid, and serves to hold the popper indicator 90 in the actuated position after the valve opening event, as shown in FIG. 12. Popper indicator 90 may include a marker 95 that serves as a visual indication that the relief valve has opened.

Figure 13:
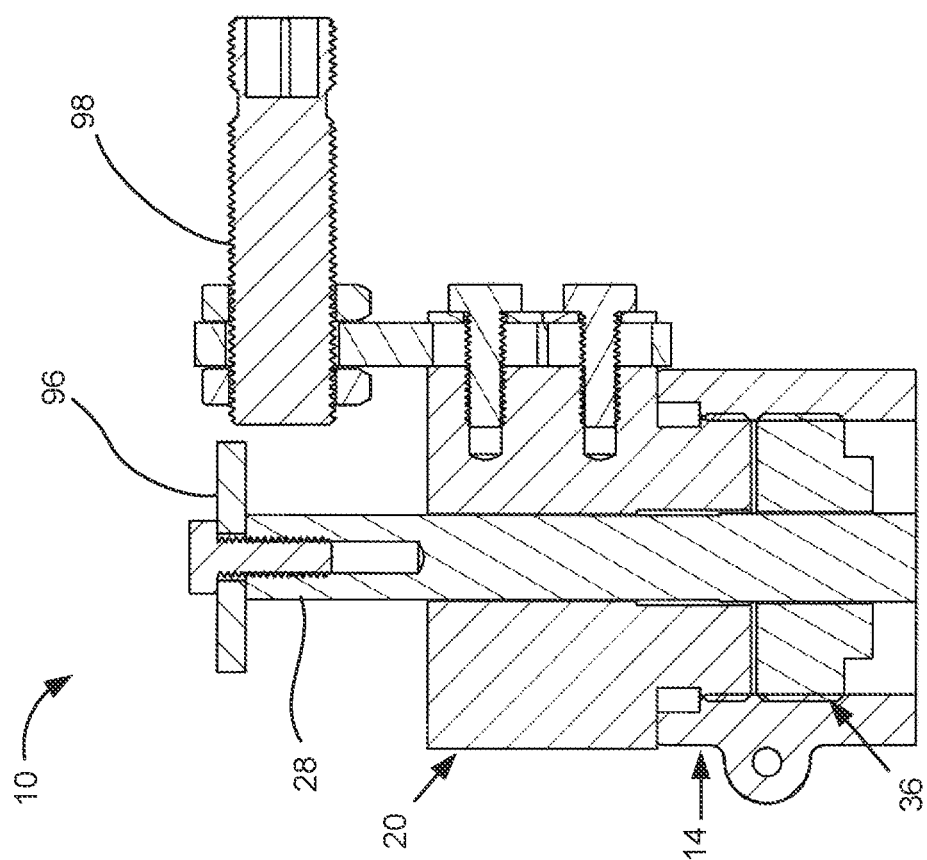
FIG. 13 is a partial sectional view of a pressure relief valve and indicator assembly including a stroke actuated proximity sensor, according to another implementation.

FIG. 13 illustrates a portion of another pressure relief valve monitoring device 10. The pressure relief valve monitoring device 10 includes a pressure relief valve 12 having a valve body 14, with an inlet port 16 and separated outlet port 18, as described above with respect to FIG. 1B.

As shown in FIG. 13, a proximity target 96 is mounted to the valve stem 28. When the relief valve opens, valve stem 28 moves longitudinally, moving proximity target 96 through the sensing field of a proximity sensor 98 that is attached to the cap assembly 20. The proximity sensor 98 detects proximity target 96 and provides a signal, indicating a relief valve opening event. Auxiliary electronics or sensing circuitry 159 (not shown in FIG. 13) communicates with the proximity sensor 98 and indicates and communicates that a valve opening event has occurred. The sensing circuitry 159 may communicate with an indicator assembly 60 and may send a signal to the indicator assembly 60 such that an LED 68 is illuminated to visually indicate that the valve has been actuated. Additionally, or alternatively, the sensing circuitry 159 (not shown in FIG. 13) and/or indicator assembly 60 may provide a wireless signal that communicates with a phone, computer or other device to indicate the relief valve has opened.

According to an implementation, the configuration of pressure relief valve monitoring device 10 in FIG. 13 may be combined with features described above in connection with FIGS. 1-6. For example, proximity sensor 98 may detect proximity target 96 when disk 26 is released from valve seat 24. Indicator assembly 60 may be configured to have an inactive (e.g., open) circuit when proximity target 96 is not detected by proximity sensor 98 and may form an active circuit between the battery 66 and LED 68 to illuminate LED 68 when proximity sensor 98 detects proximity target 96.

Figure 14:
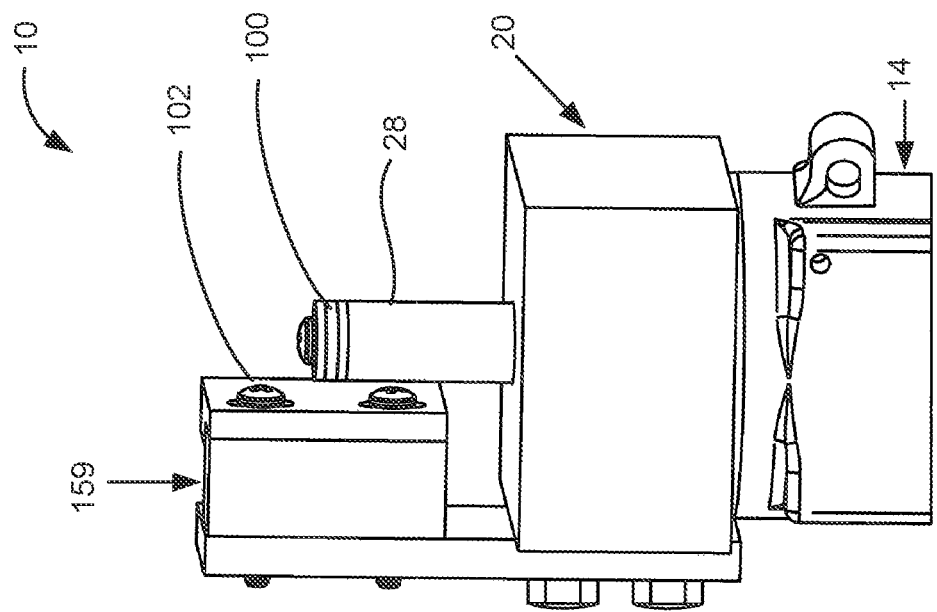
FIG. 14 is a partial sectional view of a pressure relief valve and indicator assembly including a magnetic sensor, according to another implementation.

FIG. 14 illustrates a portion of another pressure relief valve monitoring device 10. The pressure relief valve monitoring device 10 includes a pressure relief valve 12 having a valve body 14, with an inlet port 16 and separated outlet port 18, as described above with respect to FIG. 1B.

As shown in FIG. 14, a magnet 100 is mounted to the valve stem 28. When the relief valve opens, valve stem 28 moves longitudinally, moving magnet 100 through the sensing field of a magnetic sensor 102. In one implementation, magnetic sensor 102 may include a Hall-effect sensor. The magnetic sensor 102 detects magnet 100 when stem 28 is moved near magnetic sensor 102 and provides a signal, indicating a relief valve opening event. Auxiliary electronics or sensing circuitry 159 (not shown in FIG. 14) communicate with the magnetic sensor 102 and indicate and communicate that a valve opening event has occurred. The sensing circuitry 159 may communicate with an indicator assembly 60 and may send a signal to the indicator assembly 60 such that an LED 68 is illuminated to visually indicate that the valve has been actuated. Additionally, or alternatively, the sensing circuitry 159 and/or indicator assembly 60 may provide a wireless signal that communicates with a phone, computer or other device to indicate the relief valve has opened.

According to an implementation, the configuration of pressure relief valve monitoring device 10 in FIG. 14 may be combined with features described above in connection with FIGS. 1-6. For example, magnetic sensor 102 may detect magnet 100 when disk 26 is released from valve seat 24. Indicator assembly 60 may be configured to have an inactive (e.g., open) circuit when magnet 100 is not detected by magnetic sensor 102 and may form an active circuit between the battery 66 and LED 68 to illuminate LED 68 when magnetic sensor 102 detects magnet 100.

Figure 16:
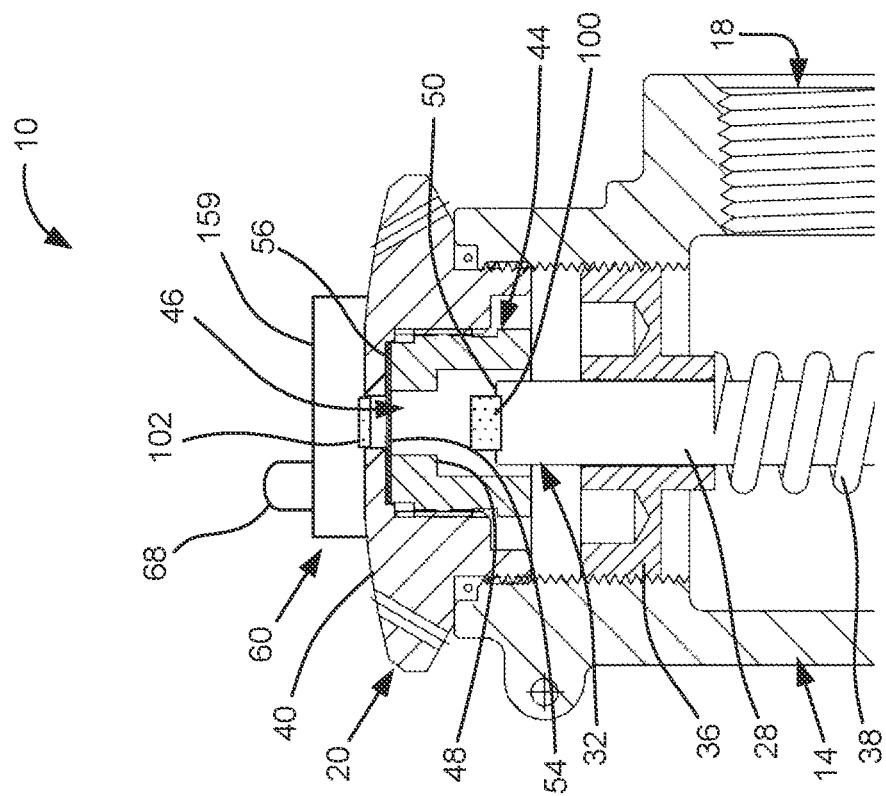

Referring to FIGS. 15 and 16, there is shown another embodiment of pressure relief valve monitoring device 10. The pressure relief valve monitoring device 10 includes a pressure relief valve 12 having a valve body 14, with an inlet port 16 and separated outlet port 18 are as described above with respect to FIG. 1A. Referring to FIGS. 14 and 15, inner nut 44 includes a through bore 46 having a shoulder 48 formed thereon. The shoulder 48 interacts with a corresponding ledge 50 formed on the distal end 32 of the stem 28 to define a stop for limiting movement of the stem 28.

Magnet 100 is mounted to the valve stem 28. When the relief valve 12 opens, valve stem 28 rises, moving magnet 100 from an initial position as shown in FIG. 15 to an activated position as shown in FIG. 16. In one aspect, magnetic sensor 102 may be positioned above the inner nut 44. A diaphragm 54 may be positioned in the bore 42 above the inner nut 44 or, alternatively, a diaphragm may be omitted. The diaphragm 54 may be formed of various materials such metal, plastic or rubber. In one aspect, the diaphragm 54 may be either formed of a material that does not deform when contacted by the valve stem 28 or is formed of a material that is elastic and returns to its original shape after being contacted by the valve stem 28. The magnetic sensor 102 may be mounted to the diaphragm 54 or included in sensing circuitry 159. Upon valve opening, the magnet 100 activates the magnetic sensor 102. The magnetic sensor 102 sends a signal that change from an initial signal state to final signal state. Sensing circuitry 159 measures a change in the signal state, and indicates and communicates that a valve opening event has occurred.

In one aspect, the magnetic switch when activated may create a short circuit creating the signal. The sensing circuitry 159 may provide a wireless signal that communicates with a phone, computer or other device to indicate the relief valve has opened. Alternatively, the sensing circuitry 159 may send a signal to the indicator assembly 60 such that an LED 68 is illuminated to visually indicate that the valve has been actuated. In another aspect, the sensing circuitry 56 may be coupled to a relay and wire linked with a programmable logic controller (PLC) to indicate a valve opening.

In one aspect, the sensing circuitry 59/159 may include a temporal or time function that measures a time that the relief valve is open. For example, sensing circuitry 59/159 may record time stamps that indicate the start and end times of when disk 26 is in a release position (e.g., based on detection of stem 28 position). The temporal function of sensing circuitry 59/159 may be incorporated within any of several embodiments described above. For example, referring to FIG. 2A, when diaphragm 54 is elastic, sensing circuitry 59 may detect the duration of a changed state in the strain sensor 57. As another example, referring to FIG. 7, sensing circuitry 159 may detect the duration of a changed state in the strain sensor 152 on spring 38. In still another example, sensing circuitry 159 may detect the duration of a pressure change from pressure sensor 252 (e.g., FIG. 8). The duration of a position change of stem 28 may be similarly detected, for example, using the embodiments of FIGS. 13-16.

The temporal measurements from sensing circuitry 59/159 may be utilized to determine a volume of fluid (e.g., gas) released through the relief valve based upon, for example, the valve dimensions and the pressure and properties of gas in the monitored system. In one aspect, the temporal function may be indicated by a time stamp associated with a real time clock that is implemented by the sensing circuitry 59/159. The time data or the calculated volume of gas released may be transmitted to a phone, computer or other device that displays the volume of the released gas.

According to another implementation, indicator assembly 60 may include a circuit continuity and battery check structure that may check circuit continuity and battery power within the system. The circuit continuity and battery check structure may be utilized in any of the embodiments described above, such as in FIGS. 1-16 or with other pressure relief valve monitoring devices.

A battery (e.g., battery 66) may be utilized to provide a current to sensing circuitry 59/159 and be utilized to power the LED 68 or transmit information wirelessly to another device, as described above. The circuit continuity and battery check structure may include a diagnostic switch, such as a reed switch that may be actuated by a magnetic field. In one aspect, the magnet may be positioned on a tag attached to the relief valve. When the magnet or tag is moved in proximity to the diagnostic switch, the diagnostic switch allows sensing if a fuse has been broken in versions of the valve that include a frangible fuse as an indicator of a valve opening. Further, the diagnostic switch may verify that the battery has a charge by providing a visual indication such as with the LED 68 as described above. If the LED 68 does not light then it can be an indication that the battery needs replacement.

Figure 17:
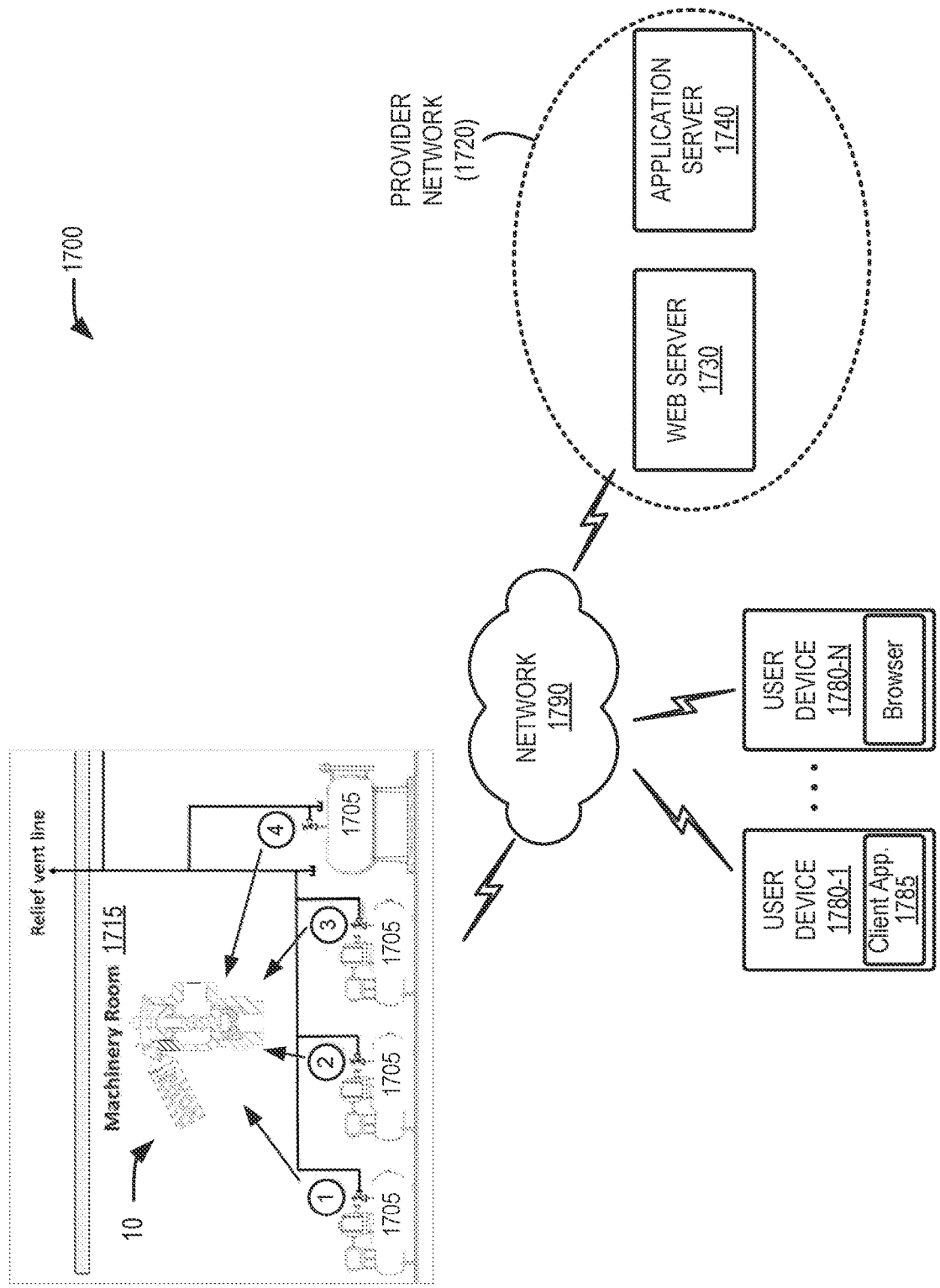
FIG. 17 is a diagram illustrating an exemplary environment in which systems and/or methods described herein may be implemented.

FIG. 17 is a diagram illustrating an exemplary environment 1700 in which systems and/or methods described herein may be implemented. As illustrated, environment 1700 may include refrigeration equipment 1705 (collectively and individually referred to herein as "refrigeration equipment 1705"). Each of refrigeration equipment 1705 may include a pressure relief valve monitoring device 10. Refrigeration equipment 1705 with mounted pressure relief valve monitoring devices 10 may be distributed throughout a machinery room or customer premises 1715. Environment 1700 may also include a provider network 1720 with a web server 1730 and/or an application server 1740; and user devices 1780-1 through 1780-N (collectively referred to herein as "user devices 1780" and individually as "user device 1780"), interconnected by a network 1790. Components of environment 1700 may be connected via wired and/or wireless links.

Refrigeration equipment 1705 may include a compressor or another piece of equipment the user wishes to monitor using pressure relief valve monitoring device 10.

Pressure relief valve monitoring device 10 may include features described above. According to various embodiments, pressure relief valve monitoring device 10 may include hardware, such as a processor, application-specific integrated circuit (ASIC), a field-programmable gate array (FPGA), or a combination of hardware and software (e.g., a processor executing software) to execute various types of functions described further herein. According to an implementation, the hardware or combination of hardware and software may be included, for example, in sensing circuitry 59/159 and/or indicator assembly 60.

According to an implementation, indicator assembly 60 may include, for example, a communication interface, such as transceiver 61 (e.g., FIG. 2B) that enables indicator assembly 60 to communicate with other devices and/or systems via wireless communications or a combination of wireless and wired communications. For example, the communication interface may include mechanisms for communicating with another device or system via network 1790. The communication interface may include an antenna assembly for transmission and/or reception of radio frequency (RF) signals. For example, the communication interface may include one or more antennas to transmit and/or receive RF signals over the air. The communication interface may, for example, receive RF signals and transmit them over the air to provider network 1720, and receive RF signals over the air originating from user devices 1780.

In one implementation, for example, the communication interface may communicate with a network and/or devices connected to a network. Alternatively or additionally, the communication interface may be a logical component that includes input and output ports, input and output systems, and/or other input and output components that facilitate the transmission of data to other devices. For example, the communication interface may include a network interface card (e.g., Ethernet card) for wired communications and/or a wireless network interface (e.g., a Wi-Fi card for wireless communications. The communication interface may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described further herein, pressure relief valve monitoring device 10 may be attached to pipe lines supplying refrigerant to refrigeration equipment 1705. When high pressure builds up to a pressure threshold in one of pressure relief valve monitoring devices 10, disk 26 inside the valve moves longitudinally, causing stem 28 to make contact with a sensing device, such as switch or sensor 52. Switch or sensor 52 may communicate with indicator assembly 60 to turn on indicator light 68. As the disk 26 moves, high pressure refrigerant vents through the exit port 18, which may trigger a mandatory reporting of the refrigerant release. According to an implementation, indicator assembly 60 may include wireless communication capabilities to initiate wireless communications that report the valve release.

Provider network 1720 may include network devices, computing devices, and other equipment to provide services, including services for customers with pressure relief valve monitoring device 10. For example, devices in provider network 1720 may supply backend services to user devices 1780 for remotely monitoring pressure relief valve monitoring device 10. Provider network 1720 may include, for example, one or more private Internet Protocol (IP) networks that use a private IP address space. Provider network 1720 may include a local area network (LAN), an intranet, a private wide area network (WAN), etc. According to an implementation, provider network 1720 may use vendor-specific protocols to support Internet of Things (IoT) management. Although shown as a single network in FIG. 17, provider network 1720 may include a number of separate networks.

Web server 1730 may include one or more network or computational devices to manage service requests from eligible user devices 1780. In one implementation, web server 1730 may provide an application (e.g., an event notification application) and/or instructions to user device 1780 to enable user device 1780 to receive and respond to information related to pressure relief valve monitoring devices 10. In another implementation, web server 1730 may provide multiple types of browser-based user interfaces to facilitate individual monitoring, system monitoring, receiving notifications, etc. Web server 1730 may receive settings from user devices 1780, may process/collate the received settings, and may forward the settings to application server 1740 for implementation.

Application server 1740 may include one or more network or computational devices to perform services accessed through web server 1730. For example, application server

1740 may manage downloading applications provided to user devices 1780, may process incoming data (e.g., from pressure relief valve monitoring devices 10), and/or provide configuration information to pressure relief valve monitoring device 10. According to an implementation, application server 1740 may use a series of application programming interface (API) calls/responses to send and receive data from pressure relief valve monitoring devices 10.

User device 1780 includes a device that has computational and wireless communication capabilities. User device 1780 may be associated with personnel, for example, that monitor refrigeration equipment 1705. User device 1780 may be implemented as a mobile device, a portable device, a stationary device, a device operated by a user, or a device not operated by a user. For example, user device 1780 may be implemented as a smartphone, a computer, a tablet, a wearable device, or some other type of wireless device. According to various exemplary embodiments, user device 1780 may be configured to execute various types of software (e.g., applications, programs, etc.). In one implementation, user device 1780 may download and/or register a client application 1785. Client application 1785 (or "app") may be designed to access, from provider network 1720, notifications reported by pressure relief valve monitoring devices 10. In another implementation, user device 1780 may use a web browser to connect to web server 1730 and perform similar functions of client application 1785.

Network 1790 may include one or more wired, wireless and/or optical networks that are capable of receiving and transmitting data, voice and/or video signals. For example, network 1790 may include one or more access networks, IP multimedia subsystem (IMS) networks, core networks, or other networks. The access network may include one or more wireless networks and may include a number of transmission towers for receiving wireless signals and forwarding wireless signals toward the intended destinations. The access network may include a wireless communications network that connects entities (e.g., pressure relief valve monitoring device 10, user devices 1780, etc.) to other portions of network 1790 (e.g., the core network). In one example, the access network may include a long-term evolution (LTE) network. In other implementations, the access network may employ other cellular broadband network standards such as 3rd Generation Partnership Project (3GPP) Fifth Generation (5G) and future standards. Network 1790 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data.

In FIG. 17, the particular arrangement and number of components of environment 1700 are illustrated for simplicity. In practice there may be more pressure relief valve monitoring device 10, provider networks 1720, user devices 1780, and/or networks 1790. For example, there may be hundreds or thousands of pressure relief valve monitoring devices 10.

Figure 18:
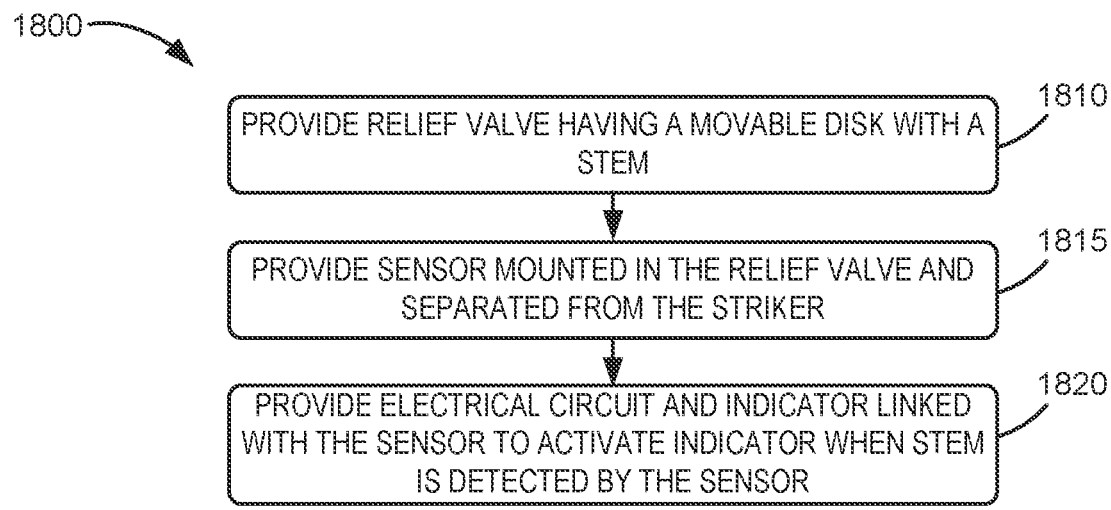
FIG. 18 is a flow diagram of an exemplary process for detecting a relief valve opening.

FIG. 18 is flow diagram of an exemplary process 1800 for detecting a relief valve opening. Process 1800 includes providing a relief valve having a movable disk with a stem (block 1810); providing a sensor mounted in the relief valve and separated from the striker (block 1820); providing an electrical circuit and indicator linked with the sensor, wherein, upon release of fluid pressure through the valve, which occurs when the fluid pressure has enough force to unseat the disk from the valve seat insert, the disk moves and the stem is detected by the sensor (block 1830). For example, a valve body 14 may be provided that includes disk 26 disposed within the valve body 14 and, more particularly, within valve seat insert 24. Stem 28 may be connected to disk 26 at one end with striker 34 located at distal end 32 of stem 28. Cap assembly 20 may be attached at one end of the valve body 14 to position diaphragm 54 and/or frangible fuse 58 (or, alternatively, switch 52) in the path of striker 34. Indicator assembly 60 may be linked to fuse 58 (or switch 52) by auxiliary electronics or sensing circuitry 59. When pressure at inlet port 16 causes disk 26 to be expelled from valve seat insert 24, striker 34 contacts diaphragm 54, which breaks frangible fuse 58. When fuse 58 breaks, auxiliary electronics or sensing circuitry 59 transmits a signal to indicator assembly 60 to illuminate indicator light 68 and, optionally, provide a wired or wireless signal via network 1790 to notify a user device 1580.

In one aspect the frangible fuse 58 may include glass or a glass-like substrate formed of alumina ceramics or other suitable materials and include an electrical trace formed thereon that serves as a closed electrical path for the electrical circuit. When the fuse breaks, the electrical trace is separated and the electrical circuit is now open. Additional sensing circuity of the electrical circuit communicates this condition to the indicator to provide a visual indication that the relief valve has been actuated. In one aspect, the sensing circuitry may also provide a wireless signal that communicates (e.g., via network 1790) with a phone, computer or other device to indicate the relief valve has opened.

As described above, a valve assembly includes a valve body having an inlet and an outlet; a valve seat insert attached to the valve body in a path between the inlet and the outlet; an indicator assembly, including a power source, a light source, and a sensor; a disk set within the valve seat insert; a stem extending from the disk toward the indicator assembly; and a diaphragm positioned between the stem and the indicator assembly. The valve seat insert is configured to release the disk when pressure at the inlet exceeds a threshold value. The disk is configured, when released, to move the stem into a position that is detected by the sensor. The indicator assembly forms an active circuit between the power source and the light source to illuminate the light source when the stem is detected by the sensor. The diaphragm is configured to seal an inner volume of the valve body from the indicator assembly. The pressure relief valve detection and monitoring device may use a self-contained power source that is not wired to outside power. The pressure relief valve detection and monitoring device provides a non-intrusive attachment to a refrigeration system.

In another implementation, a method includes providing a relief valve having a movable disk with a stem, wherein the disk is configured to be initially seated within the valve seat insert; providing a sensor mounted in the relief valve and separated from the stem; and providing an electrical circuit and indicator linked with the sensor. Upon release of fluid pressure through the valve, which occurs when the fluid pressure unseats the disk from the valve seat insert, the disk moves and the sensor detects the movement at the stem to initiate a light source in the indicator.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to a pressure relief valve detection system for a refrigeration system. In other implementations, the pressure relief valve detection system described herein may be used with other types of pressurize systems. For example, the processing described herein may be used with pressure valves for steam or other fluids.

Further, while series of blocks have been described with respect to FIG. 18, the order of the acts may be different in other implementations. Moreover, non-dependent blocks may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A valve assembly comprising:
    a valve body having an inlet and an outlet;
    a valve seat insert attached to the valve body between the inlet and the outlet;
    a valve cap attached at an end of the valve body, the valve cap including a sensor and an indicator assembly, wherein the sensor includes a pressure sensor configured to detect a pressure change at the valve cap;
    a disk positioned within the valve seat insert;
    an adjustment gland located between the disk and the valve cap; and
    a stem extending from the disk, through the adjustment gland, toward the indicator assembly;
    wherein the valve seat insert is configured to release the disk when pressure at the inlet exceeds a threshold value,
    wherein the disk is configured, when released, to move a section of the stem through the adjustment gland, and
    wherein the indicator assembly is configured to provide an external indication of a valve opening when the disk is released from the valve seat insert.

2. The valve assembly of claim 1,
    wherein the indicator assembly further includes a light source and a power source,
    wherein the valve body is configured to increase an internal pressure of an inner volume of the valve body when the disk is released, and
    wherein the indicator assembly is configured to form an active circuit between the power source and the light source when the pressure sensor detects the increase in the internal pressure.

3. The valve assembly of claim 1, wherein the indicator assembly further includes a communication interface to generate a signal, to an external device, that indicates when the disk is released from the valve seat insert.

4. The valve assembly of claim 3, wherein the signal is a wireless signal that is transmitted via one or more of:
    a wireless cellular network,
    a local wireless network, or
    a personal area network.

5. The valve assembly of claim 1, further comprising a power source for the indicator assembly, wherein the power source includes a battery.

6. The valve assembly of claim 1, wherein the indicator assembly further comprises logic to measure a time duration that the disk is released.

7. The valve assembly of claim 1, further comprising:
    a spring, positioned around the stem between the disk and adjustment gland, configured to bias the disk into the valve seat insert.

8. A valve assembly comprising:
    a valve body having an inlet and an outlet;
    a valve seat insert attached to the valve body between the inlet and the outlet;
    an indicator assembly including a pressure sensor configured to detect a pressure change at a valve cap;
    a disk positioned within the valve seat insert;
    an adjustment gland located between the disk and the valve cap;
    a stem extending, through the adjustment gland, between the disk and the indicator assembly; and
    a sensor configured to identify a release of the disk from the valve seat insert, wherein the valve seat insert is configured to release the disk when pressure at the inlet exceeds a threshold value,
    wherein the disk is configured, when released, to move a section of the stem through the adjustment gland, and
    wherein the indicator assembly is configured to indicate a valve opening event, based on the pressure sensor, when the disk is released from the valve seat insert.

9. The valve assembly of claim 8, wherein the indicator assembly further includes a communication interface to generate a signal, to an external device, that indicates when the disk is released from the valve seat insert.

10. The valve assembly of claim 8, wherein the indicator assembly further includes a communication interface to generate a wireless signal that is transmitted via one or more of:
    a wireless cellular network, a local wireless network, or a personal area network.

11. The valve assembly of claim 8, further comprising a power source for the indicator assembly.

12. The valve assembly of claim 8, wherein the indicator assembly further comprises logic to measure a time duration that the disk is released.

13. The valve assembly of claim 8, further comprising:

a spring, positioned around the stem between the disk and adjustment gland, configured to bias the disk into the valve seat insert.

14. The valve assembly of claim 8, wherein the indicator assembly further includes a light source and a power source, wherein the valve body is configured to increase an internal pressure of an inner volume of the valve body when the disk is released, and wherein the indicator assembly is configured to form an active circuit between the power source and the light source when the pressure sensor detects the increase in the internal pressure.

15. A method, comprising:

providing a relief valve having a movable disk with a stem, wherein the disk is configured to be initially seated within a valve seat insert while the stem extends through an adjustment gland located between the valve disk and a valve cap;

providing a sensor mounted in the relief valve and separated from the stem, wherein the sensor includes a pressure sensor configured to detect a pressure change at the valve cap; and providing an electrical circuit and an indicator linked with the sensor, wherein, upon release of fluid pressure through the relief valve, the disk moves the stem in the adjustment gland and the sensor detects a valve opening event based on the pressure change.

16. The method of claim 15, further comprising:

forming an active circuit signal when the sensor detects the movement of the stem.

17. The method of claim 16, further comprising:

transmitting a wireless signal, when the sensor detects the movement of the stem, via one or more of:

a wireless cellular network, a local wireless network, or a personal area network.

* * * * *